F. & E. SWALES.
HORSE BIT.
APPLICATION FILED MAY 14, 1910.

1,076,716.

Patented Oct. 28, 1913.

Witnesses:
R. E. Barry.
R. S. Trogner.

Inventors:
Frank Swales and Elizabeth Swales
By
Whitaker Prevost attys.

UNITED STATES PATENT OFFICE.

FRANK SWALES AND ELIZABETH SWALES, OF ISLINGTON, LONDON, ENGLAND.

HORSE-BIT.

1,076,716.   Specification of Letters Patent.   Patented Oct. 28, 1913.

Application filed May 14, 1910. Serial No. 561,380.

*To all whom it may concern:*

Be it known that we, FRANK SWALES and ELIZABETH SWALES, both subjects of the King of Great Britain, residing at 57 Cross street, Islington, London, England, have invented new and useful Improvements in Horse-Bits, of which the following is a specification.

This invention relates to horse bits embodying a combination of the ordinary snaffle and curb bits and has for its object to construct them so that head pressure by the bridle is prevented when the curb reins are in action and to provide means whereby the curb chain can be easily attached to, or detached from, a bit.

According to the invention we annex or fix cheek pieces or rings, preferably of large diameter, to the ends of the mouth bar whereby when the curb reins are in action the said rings will move freely through the billets of the bridle so that the latter will not be drawn down to cause head pressure. For attaching the curb chain to the bit we pivot a hook to the rounded upper end of each cheek-bar and we taper or cut away the said ends in such a manner that when the hooks are turned out of their normal position, gaps are left between their points and the said ends for the attachment or detachment of the chains. When, however, the hooks are in their normal positions their points are in close proximity to the said ends of the cheek-bars so that the chains cannot become detached.

To enable the invention to be fully understood we will describe it by reference to the accompanying drawing, in which:—

Figure 1:
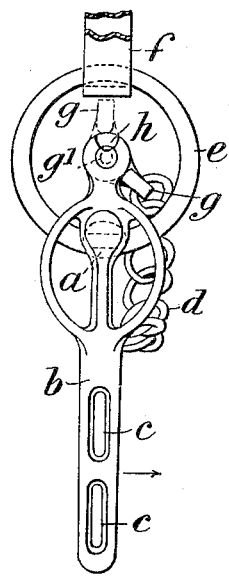
Figure 2:
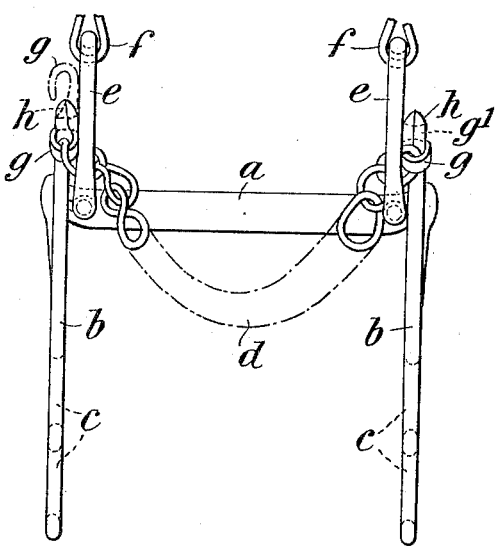
Figure 4:
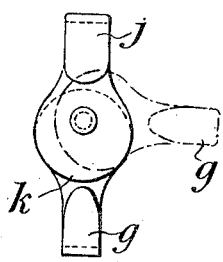
Figure 3:
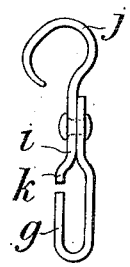

Figure 1 is a side view of a horse bit constructed according to our invention, and Fig. 2 is a rear view thereof. Figs. 3 and 4 are views at right angles to one another of a slight modification, but drawn to a larger scale than Figs. 1 and 2.

$a$ is the mouth-bar and $b$, $b$ are the cheek-bars fixed to the ends of the said mouth-bar, the lower ends of the bars $b$, $b$ being provided with slots $c$, $c$ for the attachment of the curb reins and their upper ends being connected to the curb chain $d$.

$e$, $e$ are the cheek pieces or rings which we fix to the mouth-bar $a$ and which engage with the bridle billets $f$ the said rings being advantageously of large diameter. By this arrangement when the lower portions of the bars $b$, $b$ are moved by the reins in the direction of the arrow, Fig. 1, to tighten the curb chain $d$ against the horse's lower jaw in the usual way, the said rings will move freely through the billets $f$ without drawing the latter downward to cause the bridle to produce head pressure.

$g$, $g$ are the hooks which we pivot at $g'$ to the upper rounded ends of the cheek-bars $b$, $b$ and $h$, $h$ are the reduced or cut away portions of the said ends, which portions when the points of the hooks $g$ are in coincidence therewith as indicated by the dotted lines in Figs. 1 and 2, leave gaps to enable the ends of the curb-chain $d$ to be engaged therewith or detached therefrom. When, however, the hooks $g$ are allowed to drop to their normal position, shown by the full lines in the said figures, the points of the hooks are in close proximity to the uncut portion of the upper ends of the cheek-bars $b$, $b$ so that there are no gaps for the accidental detachment of the ends of the chain.

Figs. 3 and 4 show our improved hook attachment for the curb-chain as constructed for use with forms of bit other than that above described. For this purpose the hook $g$ is pivoted to a thin piece of metal $i$ having a hooked end $j$ whereby it can be applied to bits having an eye for its reception, the said ends $j$ after engagement with such eyes being clenched thereto. The piece $i$ being in practice made of thin metal will not admit of portions being cut away as at $h$ in Figs. 1 and 2 and it therefore has its tail portion $k$ turned up to meet the end of the hook $g$ when it drops to its normal position as shown by the full lines in Fig. 4 and is eccentrically pivoted to the hook $g$ so that when the latter is turned into the position shown in dotted lines sufficient space is left to enable the curb-chain to be engaged therewith or detached therefrom. This construction reproduces in skeleton form that first described, the upturned tail portion representing or being the equivalent of the unreduced portions of the rounded upper ends of the cheek bars, and the portions of the plate $i$ not upturned representing or being the equivalent of the cut away or reduced portions of the upper ends of the cheek bars. The eccentric pivoting of the hook aids the insertion or removal of the curb, as when turned into the position indicated it brings a lesser or reduced portion of the plate $i$ opposite the point of the hook. It is to be noted that the draw of the curb chain is against the shanks of the hooks and away from the points thereof, so that no amount of shaking of the head of the horse can remove the chain from the hooks.

Having now particularly described and ascertained the nature of our said invention and in what manner the same is to be performed, we declare that what we claim is:—

1. A bit comprising a mouth bar, cheek bars rigidly secured to the ends of said mouth bar having their lower ends adapted to receive the curb reins, hooks pivotally connected to the upper ends of said cheek bars, cheek rings to receive the billets of a bridle pivoted in said mouth bar but adapted to turn with it, and a curb chain connecting the said hooks whereby a pull upon the reins will turn the mouth bar and rings and cause the latter to slide in the said billets.

2. A bit provided with a mouth bar and curb chain supporting parts, having reduced portions at their upper ends, chain receiving hooks pivotally connected to said parts on the inner faces thereof below said reduced portions and having their points extending outwardly into the planes of the outer faces of said parts and a curb chain engaging said hooks, the said hooks being normally held by the curb chain out of proximity to said reduced portions and being normally closed by the said supporting parts to prevent accidental disengagement of the curb chain.

FRANK SWALES.
ELIZABETH SWALES.

Witnesses:
JOHN E. BOUSFIELD,
C. G. REDFERN.